US005570444A

United States Patent [19]
Janssen et al.

[11] Patent Number: 5,570,444
[45] Date of Patent: Oct. 29, 1996

[54] METHOD OF OPTICALLY COUPLING OPTICAL FIBRES TO INJECTION LASERS

[75] Inventors: Adrian P. Janssen; Alan Donaldson, both of Devon, United Kingdom

[73] Assignee: Northern Telecom Limited, Montreal, Canada

[21] Appl. No.: 570,983

[22] Filed: Dec. 12, 1995

[30] Foreign Application Priority Data

Dec. 12, 1994 [GB] United Kingdom .................... 9425022

[51] Int. Cl.[6] .................................................. G02B 6/36
[52] U.S. Cl. ................... 385/90; 385/38; 385/49; 385/52; 385/88; 385/91
[58] Field of Search ................................ 385/15, 38, 39, 385/49, 51, 52, 88, 90, 91, 92

[56] References Cited

U.S. PATENT DOCUMENTS

| | | | |
|---|---|---|---|
| 4,119,363 | 10/1978 | Camlibel et al. | 385/91 X |
| 4,237,474 | 12/1980 | Ladany | 357/81 |
| 4,357,072 | 11/1982 | Goodfellow et al. | 385/91 X |
| 4,523,802 | 6/1985 | Sakaguchi et al. | 385/91 X |
| 4,768,199 | 8/1988 | Heinen et al. | 372/36 |
| 4,778,241 | 10/1988 | Haltenorth | 385/91 X |
| 4,798,439 | 1/1989 | Preston | 385/91 X |
| 5,042,890 | 8/1991 | Wehrle et al. | 385/90 |
| 5,101,464 | 3/1992 | Mousseaux et al. | 385/88 |
| 5,177,807 | 1/1993 | Avelange | 385/91 |
| 5,210,811 | 5/1993 | Avelange et al. | 385/91 |
| 5,231,686 | 7/1993 | Rabinovich | 385/93 |
| 5,301,251 | 4/1994 | Moore et al. | 385/91 |
| 5,307,434 | 4/1994 | Blonder et al. | 385/91 |
| 5,337,392 | 8/1994 | Mousseaux et al. | 385/90 |
| 5,377,289 | 12/1994 | Johnson et al. | 385/65 |
| 5,381,494 | 1/1995 | O'Donnell et al. | 385/49 |
| 5,452,390 | 9/1995 | Bechtel et al. | 385/92 |

FOREIGN PATENT DOCUMENTS

| | | | |
|---|---|---|---|
| 2124402 | 2/1984 | United Kingdom | 385/91 X |
| 2131971 | 6/1984 | United Kingdom | 385/91 X |

Primary Examiner—Brian Healy
Attorney, Agent, or Firm—Lee, Mann, Smith, McWilliams, Sweeney & Ohlson

[57] ABSTRACT

The end of an optical fibre is held in alignment with an injection laser by securing the fibre to an elongate support member whose end nearer the injection laser is then laser beam welded to a pair of slide members that have previously been secured by laser beam welding to leave a precisely dimensioned small gap between the support and slide members. The smallness of the gap minimises displacement of the fibre during the welding process. The end of the support member remote from the injection laser is secured by laser beam welding to a plastically deformable saddle.

14 Claims, 3 Drawing Sheets

METHOD OF OPTICALLY COUPLING OPTICAL FIBRES TO INJECTION LASERS

BACKGROUND TO THE INVENTION

This invention relates to the optical coupling of optical fibres, generally single mode optical fibres, to injection lasers, and is particularly concerned with the achieving of high coupling efficiency and of long-term stability in the achieved coupling efficiency. Whilst it is generally advantageous to increase coupling efficiency, such an increase is generally achieved at the expense of an increased sensitivity of the coupling to the effects of malalignment, and this is liable to militate against stability of the coupling efficiency arising from stress-relief type movements provoked over the course of time for instance by thermal cycling. For many applications where high performance is required, the alignment between fibre and laser is required to be held constant to within about 0.11 μm over a temperature range of −40° to +85° C., and through several hundred thermal shocks over the same temperature range.

Light from the laser may be coupled directly into the end of the fibre, in which case the fibre end may have a lensed refracting surface, or the light may be coupled via a separate discrete lens, typically a ball lens.

One type of coupling assembly has the injection laser mounted on a substrate provided with a platform in front of the output facet of the laser, to which platform the fibre is directly soldered once it has been moved into the alignment position found to provide optimal coupling efficiency. A serious drawback liable to occur with this alignment method is that the fibre position is disturbed in the course of the freezing of the solder pool by which it is secured to the platform. Such movement results from shrinkage effects that occur when the solder freezes, and generally the amount and direction of that movement is not predictable and reproducible. A resin may be used as an alternative to solder for the securing of the fibre to the platform, but this merely exchanges the movement problem engendered by the freezing of the solder with the movement problem engendered by the shrinkage occurring during the curing of the resin.

An alternative type of coupling assembly is described in GB 2 124 402 A to which attention is directed. In this assembly the fibre end is secured by solder in the bore of a length of hypodermic tubing, and then, once the fibre has been aligned, this tubing is secured to the platform by means of a saddle structure engaged around the tubing and laser beam welded to both the tubing and the platform. Movement of the fibre within the hypodermic tubing during the freezing of the solder does not disturb the final alignment of the fibre with respect to the laser because this alignment is not established until after such freezing of the solder has occurred. It is also to be noted that the heating involved in the laser beam welding is reasonably sharply localised, whereas if the fibre is secured in alignment by soldering, or by the thermally induced curing of a resin, the fibre is typically subjected to substantially higher temperatures while it is being so secured. Even so, it is found that the freezing of the weld-pool is liable to disturb significantly the alignment between fibre and laser. Using welding saddles and hypodermic tubes manufactured to a tolerance of ±10 μm it has been found that the welding can result in displacement of up to 5 μm. Such displacements can be corrected by subsequent straining of the hypodermic tube, but this amount of straining leaves residual stresses in the tube which are liable to relax over the course of time in the presence of thermal cycling and/or thermal shock.

Another mechanism by which misalignment may develop over the course of time between the fibre and the laser is associated with stress relief in the solder that secure the fibre in the bore of the hypodermic tubing. When a soft solder is used, it is found that over the course of time, in the presence of thermal cycling and/or thermal shock, relative movement is liable to occur between the fibre and hypodermic tube. Solder creep is found to occur, possibly occasioned in part by unevenness of plating within the bore of the tube as the result of imperfect cleanliness, by the presence of voids in the solder, and by the effects of differential thermal expansion, radial expansion of the solder being constrained by the encircling lube wall. It might be thought that such solder creep could be avoided merely by replacing the soft solder with a hard solder, but this has not been found to be an acceptable solution because the stresses involved in the hard soldering of an optical fibre within such a hypodermic tube have been found so great as upon occasion to induce spontaneous fracture of the fibre close to the point at which its lensed end protrudes from the end of the tube.

SUMMARY OF THE INVENTION

An object of the invention is to provide a method of optically coupling an optical fibre to an injection laser in a manner in which misalignments resulting from the solidification of scouring agents and from subsequent creep and/or thermal relaxation are minimised According to the present invention there is provided a method of securing the end of an optical fibre in position relative to an injection laser to provide substantially optimal optical coupling between the laser and the fibre, wherein the injection laser is secured to a substrate, wherein said one end of the optical fibre is secured to an elongate support member so that the tip of said one end of the fibre lies in the vicinity of one end of the support member, wherein said one end of the support member is located between two slide members engaged with co-operating runners on the substrate, and wherein the position of the fibre relative to the substrate is adjusted to provide substantially optimal optical coupling between the laser and the fibre, which position is substantially maintained while both slide members are positioned minimally separated from contact with the support member and are then secured to the substrate, and also while the support member is then secured to the slide members.

Preferably the elongate support member to which the optical fibre is secured is a slotted rod in whose slot the fibre is secured by means of hard solder in a region of the slotted rod adjacent the end adjacent the laser.

BRIEF DESCRIPTION OF THE DRAWINGS

There follows a description of a method of securing the end of an optical fibre in position relative to an injection laser to provide substantially optimal coupling between the laser and the fibre, which method embodies the invention in a preferred form. The description refers to the accompanying drawings in which.

DETAILED DESCRIPTION OF A PREFERRED EMBODIMENT

Figure 1:
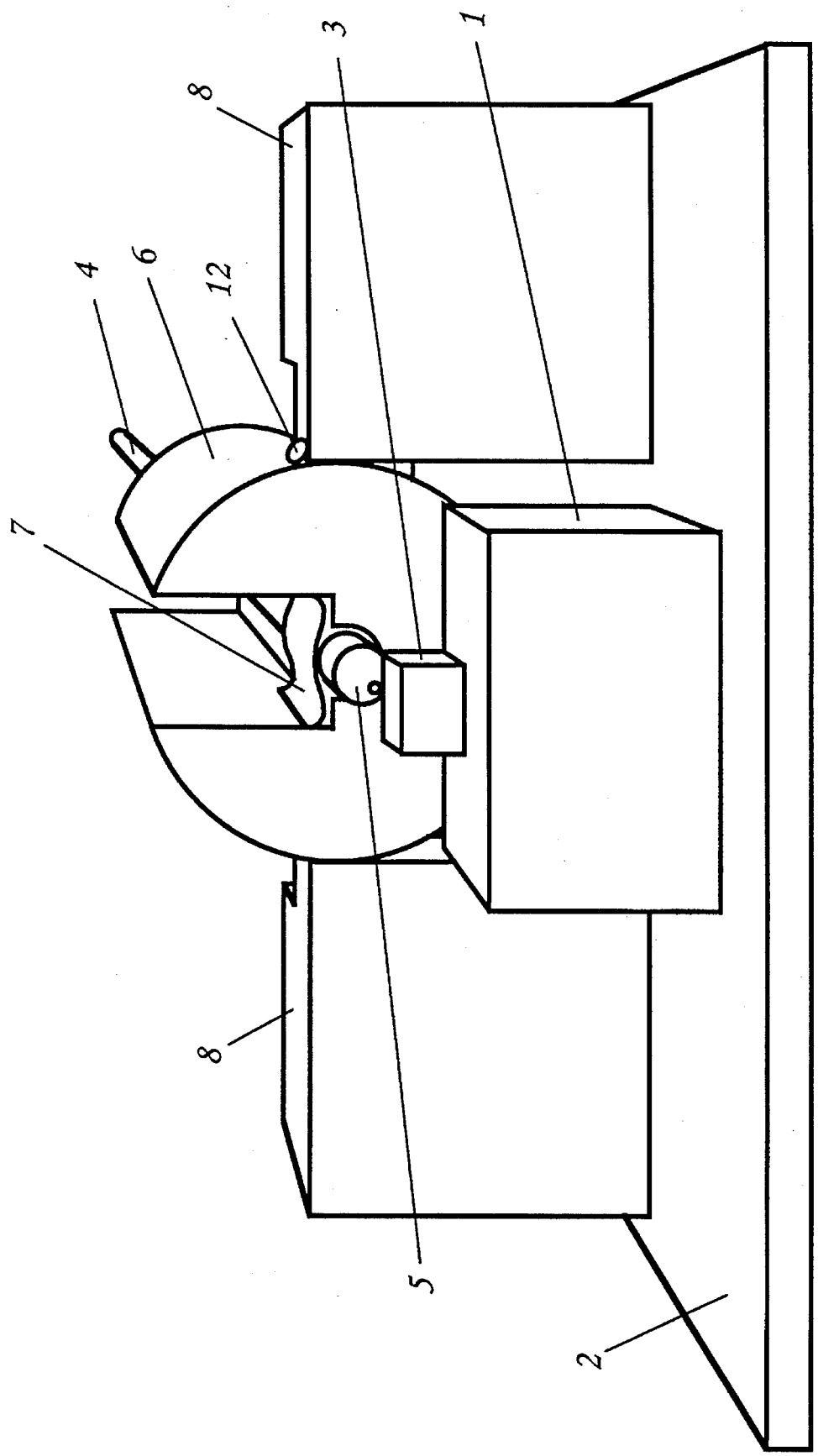
FIG. 1 is a schematic perspective view of the assembly (excluding its saddle member) viewed from the laser end.

A diamond heat-sink 1 is mounted on a low thermal expansion coefficient substrate 2 made for instance of 'KOVAR'. On the heat-sink 1 is mounted an injection laser 3 with its output emission facet substantially flush with a side edge of the diamond heat-sink. The laser emission is to be coupled into a single mode optical fibre 4 which is provided with a lensed end 5 in order to improve laser-to-fibre coupling efficiency. Near the lensed end 5, the optical fibre 4 is secured within an elongate support member, which is also preferably made of a low thermal expansion coefficient material. This support member may take the form of a length of hypodermic tube having the fibre secured to its bore by means of soft solder, but a preferred form of support member is that of a slotted rod 6. The optical fibre 4 is secured in the slot of this rod by means of a fillet 7 of solder positioned near the lensed end. Preferably this solder fillet 7 is a filet of gold tin hard solder Although hard soldering such a fibre within the bore of a hypodermic tube has been found to produce differential thermal expansion related stresses sufficient to risk spontaneous fracture of the fibre where it emerges from the solder, it is found that the stresses resulting from hard soldering the fibre in the bottom of the slotted rod are so much smaller that this sort of spontaneous fracture is not a problem. The reduction in stress is believed to be the result of the fact that in this instance the solder is not fully encircled by the rigid wall of low thermal expansion material: the outer surface of the solder being bounded only in part by such material, the remainder of the outer surface, the top part, being unconfined, and hence free to expand radially with respect to the fibre.

Figure 2:
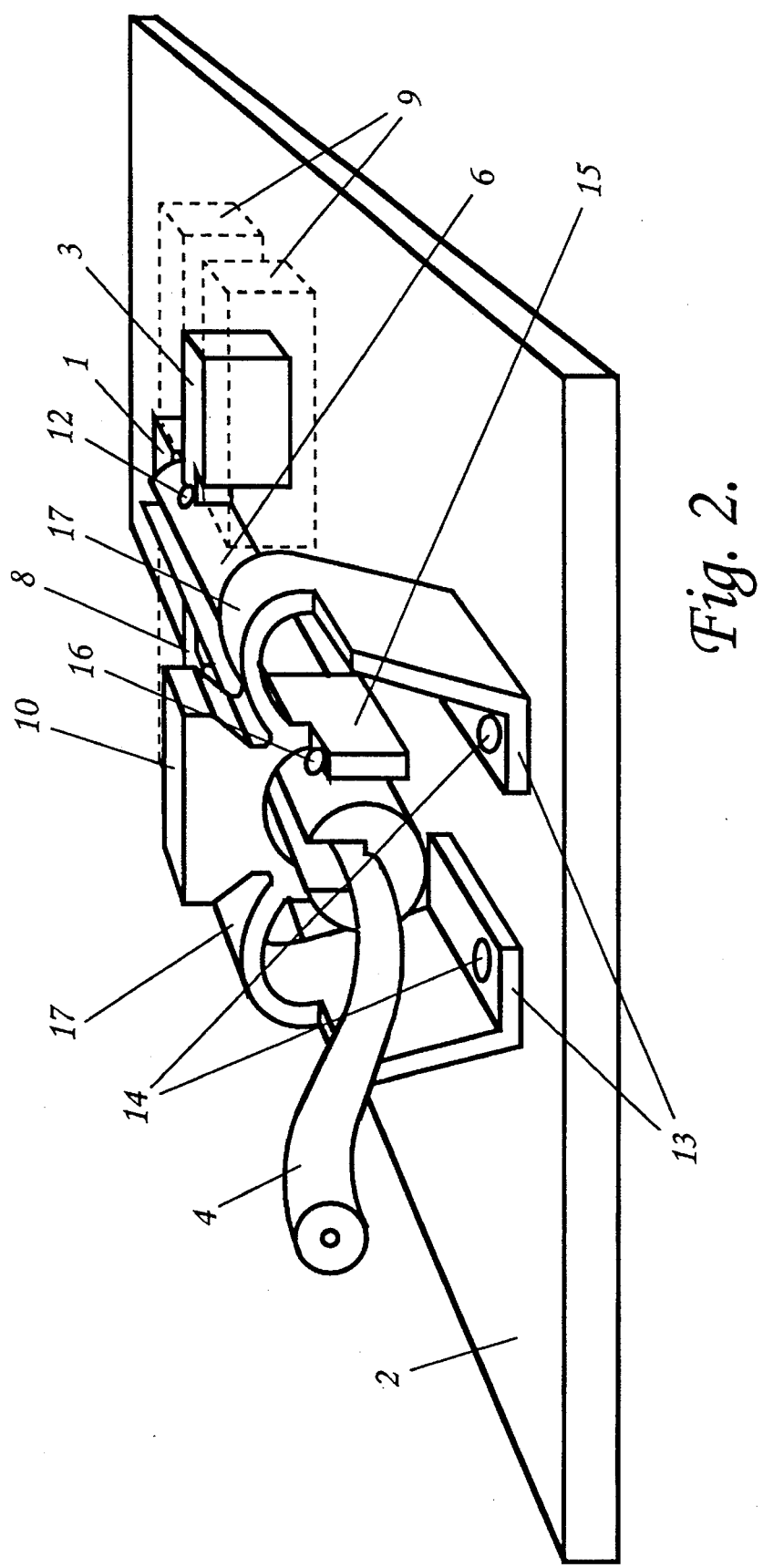
FIG. 2 is a schematic perspective view of the assembly viewed from the fibre end.
Figure 3:
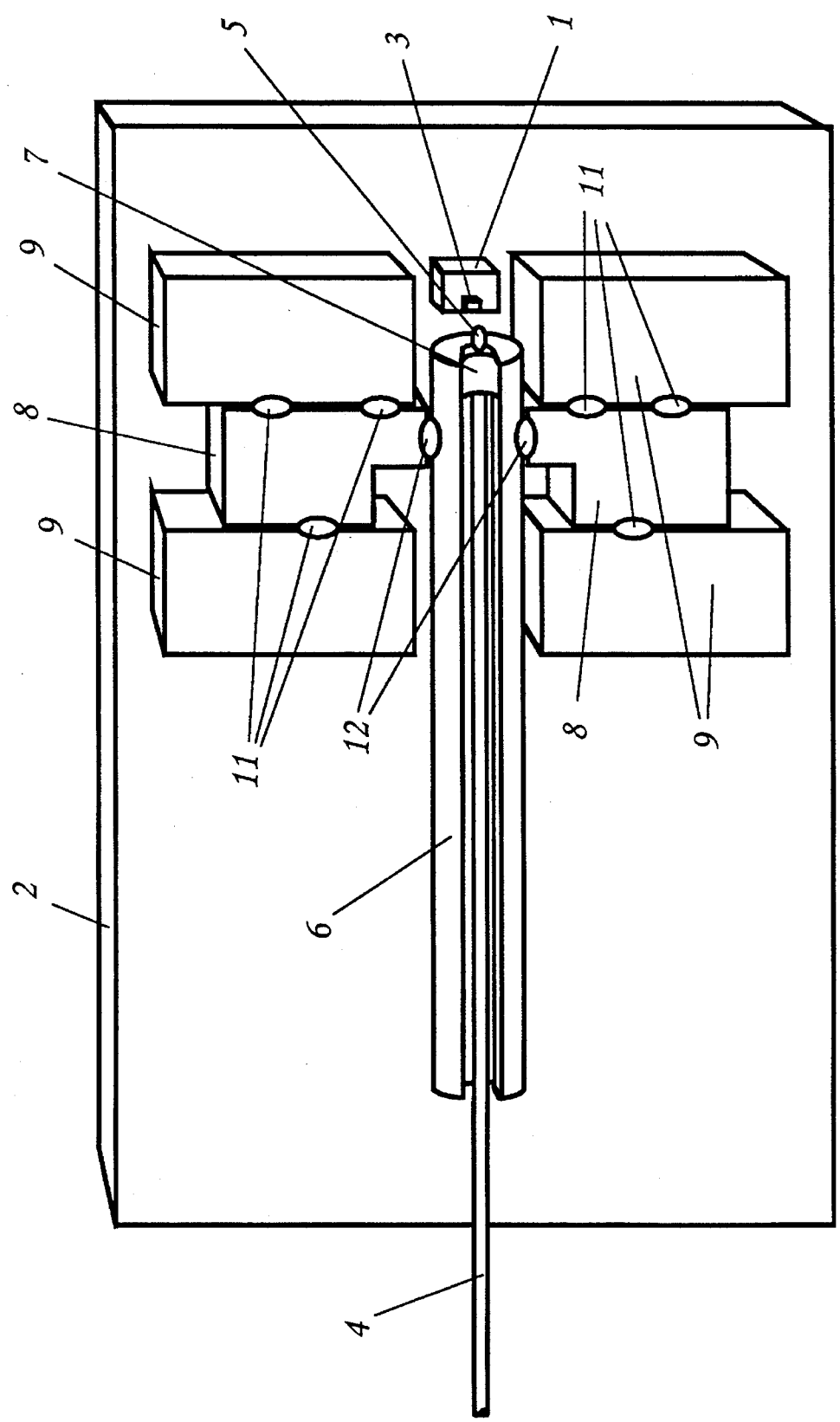
FIG. 3 is a schematic perspective view of the assembly (excluding its saddle member) viewed from the top.

The lensed end 5 of the fibre 4 is required to be accurately aligned with respect to the laser 3 so as to provide substantially optimised optical coupling efficiency between them, and moreover that alignment is required to be maintained with minimal variation, as over the course of time, the assembly becomes subject to thermal cycling and thermal shock. Such alignment is provided by powering the laser 3, monitoring the level of power launched into the fibre 4 for the laser 3, and manipulating, with a micromanipulator (not shown), the slotted rod 6 to bring the fibre 4 into the position providing the maximum level of monitored power. At this stage the rod must be stably secured in a manner providing minimal disturbance of the alignment. The end of the slotted rod 7 nearer the lensed end 5 of the fibre 4 is secured by laser beam welding to two low thermal expansion slide members 8 that are themselves fixed in position by laser beam welding to co-operating runners that are constituted by pairs of blocks 9 protruding from the substrate 2. (For convenience of illustration these blocks have not been depicted in FIG. 1, they are depicted in FIG. 3 and in FIG. 2 they are depicted in broken outline only). Before they are secured, the slide members 8 slide in a direction at right angles to the axis of the slotted rod 6. The end of the slotted rod remote from the lensed end 5 of the fibre 4 is similarly secured by laser beam welding to a plastically deformable saddle member 10 that is laser beam welded to the substrate 2.

The sequence of assembly is first to use the micromanipulator to hold the slotted rod in its required position, and then to slide the slide members 8 into contact with the sides of the slotted rod 7. These are then moved away from contact by a controlled amount to provide a gap of a specific narrow width typically about 1 to 3 μm. The use of the two slide members enables these two gaps to be provided with a precision that is not conveniently attainable with a single piece part embracing the slotted rod having positioned each slide member to provide the required gap between it and the slotted rod. The slide members are secured to the blocks 9 by laser beam welds 11. The arrangement of the slide members and their blocks is such that the welds 11 bridge junctions between the slide members and blocks that extend in directions substantially at right angles to the axial direction of the fibre. Accordingly any weld contraction induced displacement of the blocks resulting from the making of the welds 11 is substantially confined to the axial direction of the fibre, thereby leaving the gaps between slide members and the slotted rod substantially unchanged. After the welding of the slide members to the blocks 9, the slotted rod 6 is secured to each slide member 8 by a single laser beam weld 12 straddling the precision gap between that slide member and the rod. In this way the transverse displacement of the rod during the making of these welds 12 is minimised, typically being kept to well under 1 μm. (In the absence of the precision gaps, and using instead precision piece-parts manufactured to a tolerance of ±10 μm, the weld displacement would be up to 51 μm). Any such small transverse displacement as does occur in the making of the welds 12 is compensated by re-alignment brought about with the aid of the deformable saddle 10. This saddle is positioned loosely around the slotted rod 6, and its two feet 13 are secured to the substrate by laser beam welds 14. Then the slotted rod is secured to two shoulders 15 of the saddle by two further laser beam welds 16 across gaps made as small as possible in order to minimise transverse weld displacement. The saddle is designed to allow plastic deformation to occur within two arms 17 connecting the shoulders 15 of the saddle to its feet 13. After the welding, the saddle and rod can be suitably re-positioned by deforming the saddle arms by pushing the assembly beyond the elastic limit of those arms with a suitable tool (not shown).

By making the substrate 2, the slotted rod 6, the slide members 8, their co-operating runner blocks 9, and the deformable saddle 10, all of the same low expansion material, such as KOVAR, the precise positioning of the end 5 of the optical fibre 4 relative to the laser should be substantially independent of temperature. If the assembly is heated or cooled, the rod will typically heat up or cool down more slowly than the substrate because of the finite thermal impedance presented to the flow of heat in or out of the rod by Way of the saddle and slide members and their associated welds. This means that, during such heating or cooling of the assembly, the rod is liable to be at a different temperature from that of the substrate. Thermal expansion effect related stresses occasioned by this difference are accommodated principally by articulation of the saddle since the welds by which it is pinned to the substrate lie in a single straight line extending in a direction at right angles to the axis of the rod, whereas the slide members present a more rigid structure, the welds by which they are pinned to the runner blocks 9 lying in a pair of straight lines that are spaced apart in the axial direction of the rod.

Since KOVAR is not readily wetted by solder, the substrate 2 and the slotted rod 6 are both plated to improve solder wettability. This plating may for instance comprise a nickel layer of between 6 and 8 μm thickness followed by a 2 μm thick gold layer provided to protect the underlying nickel from oxidation. If the runner blocks 9 are formed integrally with the substrate, they will also be plated. On the other hand, the slide members 8 and the deformable saddle 10 are preferably left unplated. This is so that they retain their matt surfaces and thus the more readily absorb the energy of the laser beam welding radiation.

We claim:

1. A method of securing the end of an optical fibre in position relative to an injection laser to provide substantially optimal optical coupling between the laser and the fibre, wherein the injection laser is secured to a substrate, wherein said one end of the optical fibre is secured to an elongate support member so that the tip of said one end of the fibre lies in the vicinity of one end of the support member, wherein said one end of the support member is located between two slide members engaged with co-operating runners on the substrate, and wherein the position of the fibre relative to the substrate is adjusted to provide substantially optimal optical coupling between the laser and the fibre, which position is substantially maintained while both slide members are positioned minimally separated from contact with the support member and are then secured to the substrate, and also while the support member is then secured to the slide members.

2. A method as claimed in claim 1, wherein the support member is secured to the slide members by welds positioned to provide an effective fulcrum about which the support member is articulatable relative to the slide members to a limited extent, and wherein the support member is subsequently additionally secured to the substrate at a location remote from the fulcrum.

3. A method as claimed in claim 2, wherein the additional securing of the support member to the substrate is provided by engaging a plastically deformable saddle member around the support member at a distance from the slide members, and securing the saddle to both the support member and the substrate.

4. A method as claimed in claim 3, wherein the support member is secured to the slide members by laser beam welding.

5. A method as claimed in claim 4, wherein the slide members and co-operating runners are configured so that, before the slide members are secured, they are slideable in a direction substantially at right angles to the direction of axial extent of said one end of the fibre.

6. A method as claimed in claim 5, wherein the slide members are secured to the substrate by welding them to the runners with welds positioned such that any movement of the slide members relative to the substrate occasioned by the freezing of weld pools generated in said welding is confined substantially exclusively to the direction of axial extent of said one end of the fibre.

7. A method as claimed in claim 6, wherein the optical fibre is secured to the support member with a mass of substantially creep-free material which is configured to be free to expand radially with respect to the fibre over a portion of the surface of that mass.

8. A method as claimed in claim 7, wherein the optical fibre is secured to the support member with a mass of hard solder.

9. A method as claimed in claim 2, wherein the slide members and co-operating runners are configured so that, before the slide members are secured, they are slideable in a direction substantially at right angles to the direction of axial extent of said one end of the fibre.

10. A method as claimed in claim 9, wherein the slide members are secured to the substrate by welding them to the runners with welds positioned such that any movement of the slide members relative to the substrate occasioned by the freezing of weld pools generated in said welding is confined substantially exclusively to the direction of axial extent of said one end of the fibre.

11. A method as claimed in claim 10, wherein the optical fibre is secured to the support member with a mass of substantially creep-free material which is configured to be free to expand radially with respect to the fibre over a portion of the surface of that mass.

12. A method as claimed in claim 11, wherein the optical fibre is secured to the support member with a mass of hard solder.

13. A method as claimed in claim 2, wherein the optical fibre is secured to the support member with a mass of substantially creep-free material which is configured to be free to expand radially with respect to the fibre over a portion of the surface of that mass.

14. A method as claimed in claim 13, wherein the optical fibre is secured to the support member with a mass of hard solder.

\* \* \* \* \*